US008879419B2

(12) United States Patent
Roberts et al.

(10) Patent No.: US 8,879,419 B2
(45) Date of Patent: Nov. 4, 2014

(54) SYSTEM AND METHOD FOR REGISTERING AN IP TELEPHONE

(75) Inventors: Michael Roberts, Overland Park, KS (US); Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 795 days.

(21) Appl. No.: 12/510,616

(22) Filed: Jul. 28, 2009

(65) Prior Publication Data

US 2011/0026516 A1 Feb. 3, 2011

(51) Int. Cl.
*H04L 12/28* (2006.01)
*H04L 29/06* (2006.01)
*H04M 1/253* (2006.01)

(52) U.S. Cl.
CPC ............ *H04L 65/1063* (2013.01); *H04L 65/80* (2013.01); *H04L 65/1069* (2013.01); *H04M 1/2535* (2013.01); *H04L 65/1073* (2013.01)
USPC .......................................... 370/254; 370/401

(58) Field of Classification Search
None
See application file for complete search history.

(56) References Cited

U.S. PATENT DOCUMENTS

| | | | |
|---|---|---|---|
| 6,091,720 A * | 7/2000 | Bedard et al. ................. | 370/238 |
| 6,973,313 B1 * | 12/2005 | Sebastian ...................... | 370/331 |
| 8,059,557 B1 * | 11/2011 | Sigg et al. ..................... | 370/252 |
| 2003/0016678 A1 * | 1/2003 | Maeno ........................... | 370/400 |
| 2004/0054805 A1 * | 3/2004 | Sen et al. ....................... | 709/240 |
| 2006/0092843 A1 * | 5/2006 | Iwami ............................ | 370/235 |
| 2006/0120375 A1 * | 6/2006 | Ravikumar et al. ........... | 370/392 |
| 2006/0218624 A1 * | 9/2006 | Ravikumar et al. ............... | 726/3 |
| 2006/0229068 A1 * | 10/2006 | Niemela et al. ............ | 455/426.1 |
| 2007/0250625 A1 * | 10/2007 | Titus ............................. | 709/224 |
| 2007/0263544 A1 * | 11/2007 | Yamanaka et al. ............. | 370/238 |
| 2008/0019276 A1 * | 1/2008 | Takatsuji et al. .............. | 370/236 |
| 2008/0022003 A1 * | 1/2008 | Alve ............................. | 709/229 |
| 2009/0109959 A1 * | 4/2009 | Elliott et al. .................. | 370/352 |
| 2009/0264126 A1 * | 10/2009 | Khetawat et al. .......... | 455/435.1 |
| 2010/0085896 A1 * | 4/2010 | Hattori et al. ................. | 370/254 |
| 2011/0134912 A1 * | 6/2011 | Rothman et al. .............. | 370/352 |

* cited by examiner

*Primary Examiner* — Gregory Sefcheck
*Assistant Examiner* — Joshua Smith
(74) *Attorney, Agent, or Firm* — Swanson & Bratschun, L.L.C.

(57) ABSTRACT

A system and method for establishing connection of an IP telephone to a network may include, in response to receiving a registration request from an IP telephone, generating a command to cause network access devices to ping the IP telephone. The command may be communicated to the network access devices. Ping information may be received in response to the network access devices pinging the IP telephone. A network access device may be selected that has the highest quality network access path to the IP telephone. In response to selecting the network access device that has the highest quality network access path, a network address of the selected network access device may be communicated to a network device to enable the IP telephone to communicate with the selected network access device. Credentials may be communicated to the IP telephone to register with the selected network access device.

14 Claims, 4 Drawing Sheets

SYSTEM AND METHOD FOR REGISTERING AN IP TELEPHONE

BACKGROUND

Internet protocol (IP) telephones are becoming increasingly popular for consumers and businesses as the technology improves. IP telephones have several advantages over analog or other telephones, including low or no cost for placing telephone calls, bundled services with other Internet-based services, and a variety of functionality, such as company directory services.

IP telephones use Voice over Internet Protocol (VoIP) communications technology to communicate telephone calls over the Internet rather than the public switched telephone network (PSTN). IP telephones are programmed to register with session border controllers (SBCs), which are network devices, when being powered up. IP telephones are initially set-up with an IP address of regional SBCs to which the IP telephones are to register to enable connection to the Internet for users to place telephone calls thereover. The IP addresses or network addresses of the SBCs are entered or hard-coded into the IP telephones by administrators or users prior to initially using the IP telephones so that the IP telephones, during power up, communicate with the appropriate SBC to register and, after registration, access the Internet.

As conventionally performed, the IP telephone is hard-coded with a primary network address or IP address of an SBC local to the IP telephone to ensure successful access to the communications network. In addition, secondary or backup network addresses of other SBCs 106 are hard-coded into the IP telephone. For example, a first or primary network address may be 71.5.7.121, which is a network address of an SBC. Secondary or backup network addresses may be 100.10.12.5 and 67.99.5.5, which are associated with other SBCs on the communications network, and are also hard-coded into the IP telephone. As described below, hard-coding the network addresses of the SBCs are problematic for a variety of reasons.

One problem with hard-coding the IP telephones occurs when the IP telephones are physically moved from one geographic location to another. For example, if an IP telephone is relocated from California to New York and the IP telephone was originally configured with a network address of an SBC located in California, when the IP telephone is relocated, the IP telephone will continue communicating via the SBC in California unless the network address is reset to a local SBC (e.g., one located in New York).

Another problem with hard-coding the SBC addresses in the IP telephone is that short distances from the IP telephone to the SBC over the Internet does not necessarily mean quality of service (QoS) is better. For example, certain regions of the country, such as the northeast, have a lot of "hops" between network points, which may increase delay in communication between the network points. Still yet, jitter may be higher between the IP telephone and an SBC that is closer to the IP telephone than another SBC that is farther away. In summary, an IP telephone that connects to a local SBC may not receive as good QoS than a QoS that would be received by connecting to another SBC that is farther in distance.

SUMMARY

To overcome the problem of IP telephones having hard-coded network addresses (e.g., IP addresses) of SBCs for registering during power-up, the principles of the present invention provide for adaptively or dynamically determining QoS between an IP telephone and multiple SBCs and configuring the IP telephone with the network address of the SBC with the highest QoS rather than simply an SBC that is closest in distance. To perform the adaptive configuration of the IP telephone, a network registration device, such as a router, may be in communication with multiple SBCs on the communications network and determine which SBC and associated network path with the IP telephone provide the highest QoS for the IP telephone. In one embodiment, the QoS may be determined by the network registration device causing each of the SBCs to ping the IP telephone via a network path. The IP telephone, in response, returns QoS information that may be assessed by the network registration device. The network registration device may load the network address of the SBC with the highest QoS so that the IP telephone may communicate with that SBC for communications purposes. In one embodiment, the network address of the SBC may be communicated to the IP telephone for storage therein in a configuration file.

One embodiment of a system and method for establishing connection of an IP telephone to a network may include, in response to receiving a registration request from an IP telephone, generating a command to cause network access devices located on the network to ping the IP telephone via respective network paths. The command may be communicated to the network access devices. Ping information may be received in response to the network access devices pinging the IP telephone via the respective network paths. A network access device may be selected that has the highest quality network access path to the IP telephone. In response to selecting the network access device that has the highest quality network access path to the IP telephone, a network address of the selected network access device may be communicated to a network device to enable the IP telephone to communicate with the selected network access device and to register with the selected network access device. Credentials may be communicated to the IP telephone to enable the IP telephone to register with the selected network access device.

An IP telephone and method for registering the IP telephone with a communications network may include storing, by the IP telephone, a network address of a network registration device in a memory location. The IP telephone may communicate a registration request to the network registration device. The IP telephone may receive a network address of a network access device. The IP telephone may receive credentials for logging onto the network access device. The credentials may be communicated by the IP telephone to the network access device to register with the network access device to access the communications network. Telephone call signals may be communicated over the communications network by the IP telephone.

BRIEF DESCRIPTION

Illustrative embodiments of the present invention are described in detail below with reference to the attached drawing figures, which are incorporated by reference herein and wherein.

DETAILED DESCRIPTION

Figure 1:
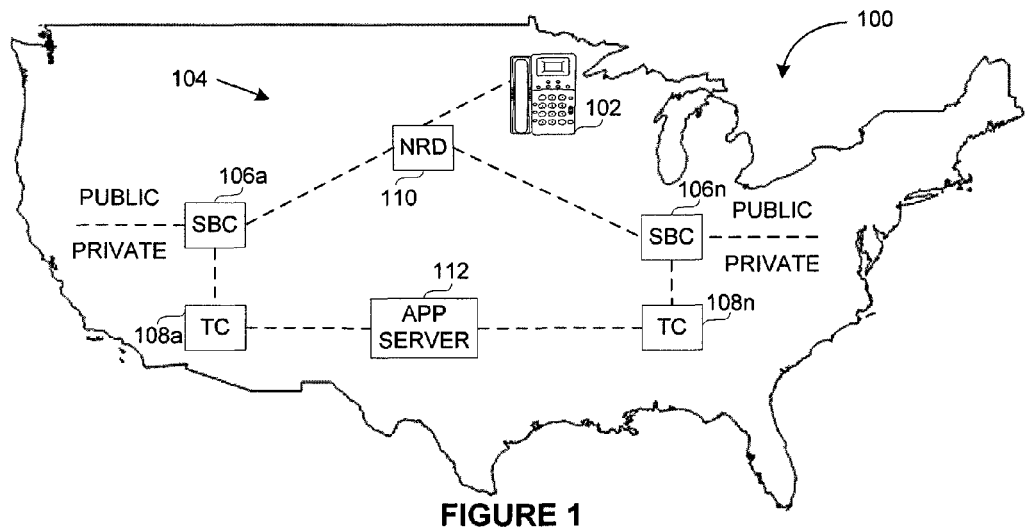
FIG. 1 is an illustration of an illustrative map of the United States showing a communications network that enables an IP telephone to communicate over the network.

With regard to FIG. 1, an illustration of an illustrative map 100 of the United States showing an IP telephone 102 communicating over a communications network 104 operating within the United States is shown. The communications network 104 may provide for the IP communications protocol to be used. The communications network 104, such as the Internet, may provide for the IP telephone 102 to operate to enable users to place telephone calls over the communications network 104 or other communications network, such as the public switch telephone network (not shown.)

The communications network 104 may include multiple network access devices, such as session border controllers 106a-106n (collectively 106). The SBCs 106 enable users to access or connect onto the communications network 104. As understood in the art, the SBCs 106 have a public side and a private side, where the IP telephone 102 accesses one of the SBCs 106 via the public side and, in response to the SBC authenticating the IP telephone, enables the IP telephone 102 to access the private side of the SBC. Each of the SBCs 106 are in communication with respective traffic controllers 108a-108n (collectively 108). The traffic controllers 108 are routers that route and control telephone calls being communicated across the communications network 104.

In accordance with the principles of the present invention, rather than hard-coding network addresses of SBCs into the IP telephone 102, an IP address of a network registration device (NRD) 110 may be stored in the IP telephone 102. The NRD 110, which operates to determine an SBC that has the highest QoS in relation to the IP telephone 102 may be used to determine a network address of the SBC with the highest QoS and communicate that network address to the IP telephone 102 for storage as a primary SBC with which the IP telephone 102 is to communicate for accessing the communications network 104. The NRD 110 may operate as a communications coordination device that coordinates the IP telephone 102 requesting access to the communications network 104 by controlling the SBCs 106 during a registration phase for the IP telephone 102. An application server 112 may be in communication with the NRD 110 and traffic controllers 108 and be configured to store a configuration file that the IP telephone 102 will store once the IP telephone 102 has access to the communications network 104.

Figure 2:
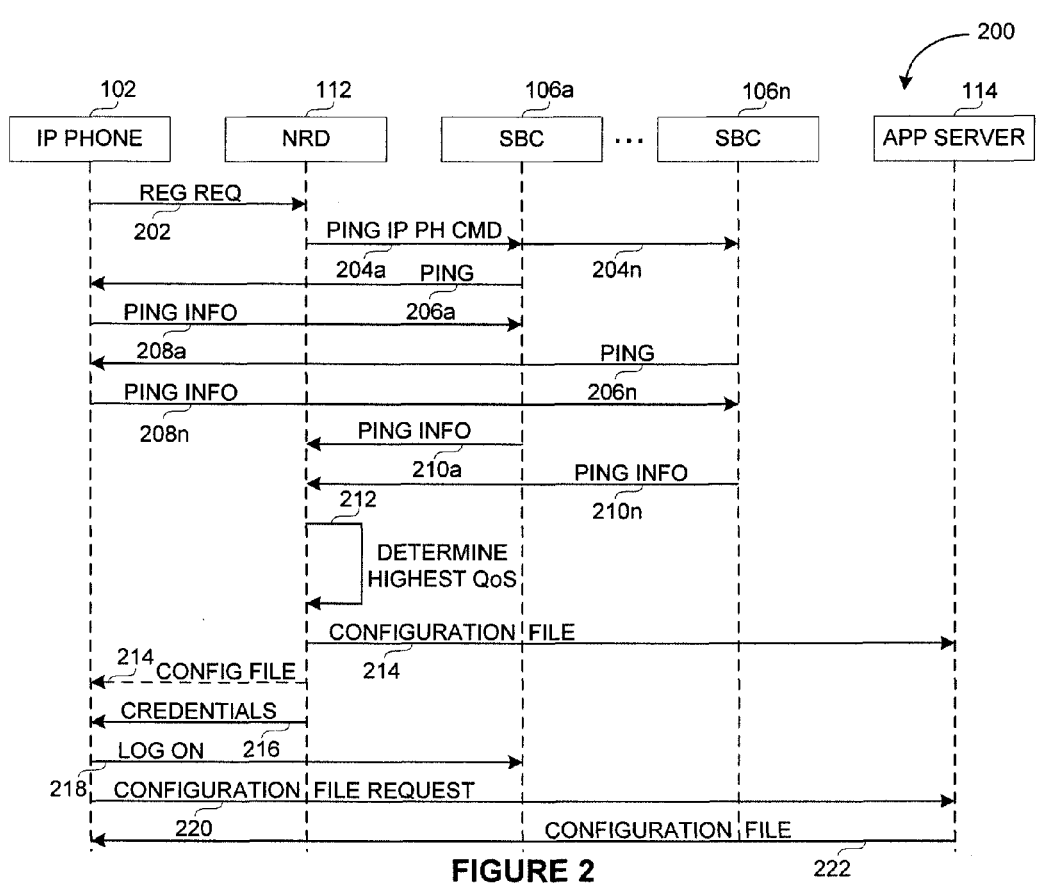
FIG. 2 is a timing diagram showing an illustrative process for an IP telephone to register with a network registration device for accessing a session border controller having the highest QoS.

With regard to FIG. 2, a timing diagram of an illustrative process 200 for the IP telephone 102 to register with an SBC is shown. At step 202, the IP telephone 102 may communicate a registration request 202 to the NRD 112. The NRD 112, in response to receiving the registration request from the IP telephone 102, may communicate a ping IP telephone command at steps 204a-204n (collectively 204) to each of the respective SBCs 106a-106n. At step 206a, the SBC 106 may communicate a "ping", as understood in the art, to the IP telephone 102, which, in response, communicates ping information at step 208 back to the SBC 106a. At step 206n, the SBC 106n communicates a "ping" to the IP telephone 102, which, in response, communicates ping information back to the SBC 106n at step 208n. The ping information may include delay, jitter, packet loss, number of hops, round-trip time, and so forth, as understood in the art. Each of the SBCs 106 may communicate the ping information at steps 210a-210n (collectively 210) to the NRD 112 for processing. At step 212, the NRD 112 may determine a highest QoS of the network paths between each of the respective SBCs 106 and IP telephone 102. In determining the highest QoS at step 212, a number of different algorithms may be utilized, including determining shortest delay, lowest jitter, least number of hops, shortest round-trip time, or a combination thereof.

At step 214, the NRD 212 may communicate a configuration file to the application server 114, where the configuration file may include data for the IP telephone to use for operating. For example, the configuration file may include one or more IP addresses for use in registering with respective SBCs, data for managing screen display, and so forth. Alternatively or in addition, the configuration file may be communicated directly to the IP telephone 102 at step 214'.

At step 216, credentials may be communicated by the NRD 112 to the IP telephone. The credentials may include a public IP address, username, and password. The credentials may enable the IP telephone 102 to access the private side of the SBC to which the IP telephone 102 is being assigned based on the determination of the highest QoS. At step 218, the IP telephone 102 may log onto the SBC 106a or whichever SBC had the highest QoS as determined at step 212. At step 220, the IP telephone 102 may communicate a configuration file request 222 to the application server 114, and, in response, the application server 114 may communicate the configuration file 222 to the IP telephone 102. At this point, the IP telephone 102 is configured to enable a user to place and receive telephone calls and other communications over the communications network.

In an alternative embodiment, if the NRD 112 is not available, if the user travels or the phone is otherwise relocated, the user may utilize short message services (SMS) or other voice or data communications service to notify an SBC to which the IP telephone is in communication. The SMS or other communication may state, "optimize SBC." The SBC to which the IP phone is in communication may, in response to receiving the SMS, may be capable of communicating with other SBCs to perform the ping test and, in response to determining which SBC has the highest QoS, update the IP telephone with the address of that SBC for future calls to be placed to that SBC. This process effectively decentralizes the process of FIG. 2 to be included in each SBC. The process may be automated as described with respect to the NRD 112 or on a request basis.

Figure 3:
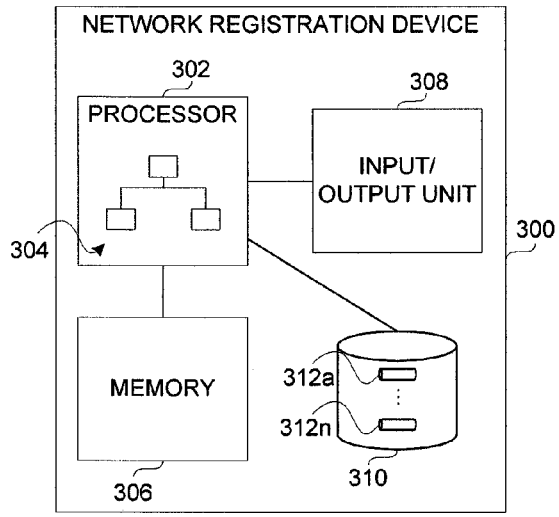
FIG. 3 is a block diagram of an illustrative network registration device that is configured to operate to register IP telephones in accordance with the principles of the present invention.

With regard to FIG. 3, a block diagram of an illustrative network registration device 300 is shown. The NRD 300 may include a processing unit 302 that executes software 304. The processing unit may be in communication with a memory 306, input/output (I/O) unit 308, and storage unit 310. The storage unit 310 may be configured to store data repositories 312a-312n (collectively 312). The software 304 may be configured to process registration requests from IP telephones and communicate with SBCs located on a communications network to process the registration requests. The memory 306 may be configured to store data, such as network address data of SBCs, and software 304 that enables the NRD 300 to process registration requests from IP telephones. The I/O unit 308 may be configured to communicate over the communications network using a communications protocol, such as communicating data packets, over the communications network. The data repositories 312 may be configured to store information associated with IP telephones of customers of a communications service provider. The information may include names, addresses, telephone numbers, network addresses of the IP telephones, and other information that may enable the NRD 300 to process registration requests from the IP telephones.

Figure 4:
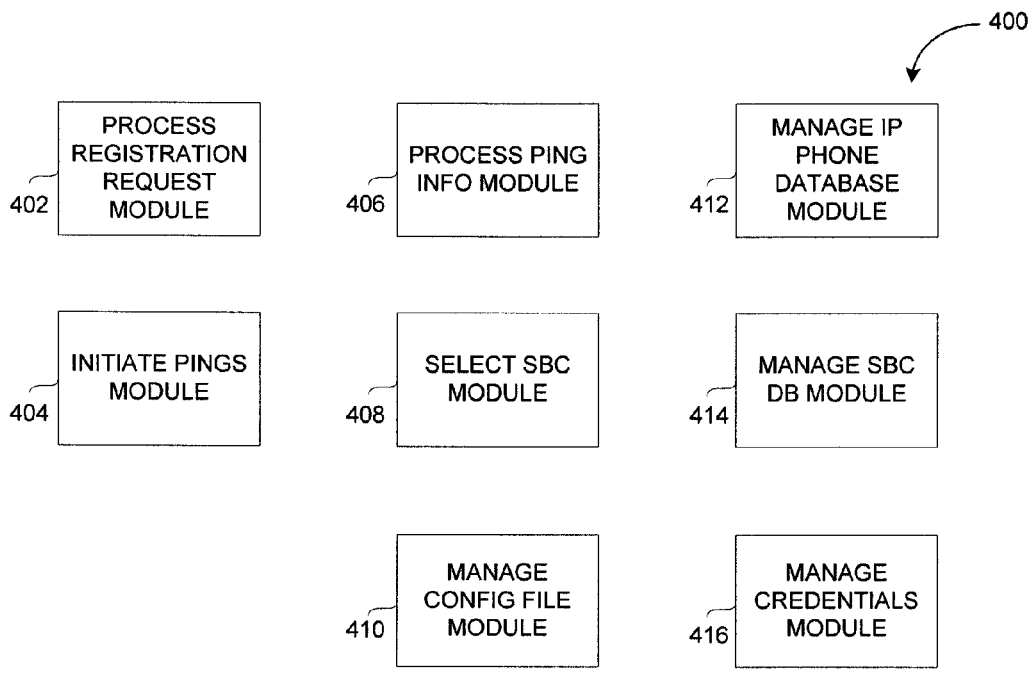
FIG. 4 is a block diagram of software modules executed by the network registration device of FIG. 3 to provide for registration functionality in accordance with the principles of the present invention.

With regard to FIG. 4, a block diagram of illustrative software modules 400 of the software 304 being executed by the processing unit 302 of the network registration device 300 of FIG. 3 is shown. The software modules 400 may include a process registration request module 402 that is configured to receive and process registration requests from IP telephones. The process registration request module 402 may determine that the respective IP telephone is registered with the NRD and able to make registration requests. An initiate pings module 404 may be configured to cause SBCs to initiate pings with IP telephones that are registering with the NRD 300 of FIG. 3. The initiate pings module 404 may be configured to, in response to receiving a registration request from an IP telephone, cause SBCs to ping the IP telephone.

A process ping information module 406 may be configured to receive and process ping information provided by SBCs that ping IP telephone during an IP telephone registration process. The process ping information module 406 may be configured to store the ping information and process the ping information to determine which of the SBCs and network paths associated with the SBCs and IP telephone has the highest QoS, as previously described.

A select SBC module 408 may be configured to select an SBC with the highest QoS or QoS value of the SBCs that provided the NRD 300 with ping information. In selecting the SBC with the highest QoS, the select SBC module 408 may be configured to process the ping information that is stored and/or processed by the process ping information module 406. As an alternative to selecting an SBC with the highest QoS, the principles of the present invention may be configured to select one or more SBCs that are located close to the IP telephone by receiving GPS coordinates, area code, or zip code, for example, from the IP telephone and use one or more databases and/or mathematical calculations to compute a physical distance between multiple SBCs and the IP telephone. The NRD 300 may also select SBCs having fewest number of hops to the IP to the IP telephone, but this selection may be made as part of or in conjunction with determining highest QoS.

A manage configuration file module 410 may be configured to manage configuration files that are stored on the NRD 300 of FIG. 3. The configuration files may include data that is used to control operation of the IP telephone, including network address of one or more SBC that was dynamically or adaptively selected by the NRD (i.e., the SBC with the highest QoS), screen display control data, and other data used by the IP telephone to operate as a telephone and communicate data.

A managed IP telephone database module 412 may be configured to store IP telephone information of IP telephones that may communicate with the NRD 300 of FIG. 3. The IP telephone database may include names associated with IP telephones, addresses associated with IP telephones, IP telephone numbers, IP telephone network addresses, and other information that may be utilized by the NRD 300 to process and perform registrations of the IP telephones.

A managed SBC database module 414 may be configured to manage network addresses of SBCs that are available to the NRD 300 of FIG. 3 for providing network access to IP telephones. The SBC databases may include network addresses, geographic locations, current status of SBCs, and any other information associated with SBCs that may be helpful to the NRD 300 for registering IP telephones.

A managed credentials module 416 may be configured to manage credentials stored by the NRD 300 of FIG. 3 for each of the IP telephones. In one embodiment, the managed credentials module 416 may be configured to store credentials for each of the IP telephones, where the credentials are permanent for each of the IP telephones. Alternatively, the managed credentials module 416 may be configured to generate credentials on a real-time basis as IP telephones register with the NRD 300.

Figure 5:
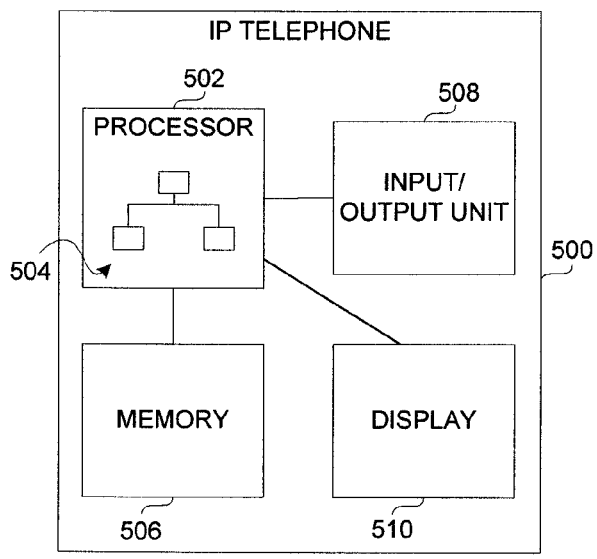
FIG. 5 is a block diagram of an illustrative IP telephone that is configured to register with a network registration device to access a communications network.

With regard to FIG. 5, a block diagram of an IP telephone 500 is shown. The IP telephone 500 may include a processing unit that executes software 504. The processing unit 502 may be in communication with a memory 506, I/O unit 508, and display 510. A user interface (not shown) may also be in communication with the processing unit 502 to enable a user to enter telephone numbers, select soft-buttons, or perform any other function, as understood in the art. The software 504 may be configured to perform a registration request with the NRD 300 of FIG. 3, and, in response to receiving a network address of an SBC with which the NRD 300 determines to have the highest QoS, store a network address of the selected SBC and communicate with that SBC in placing telephone calls or otherwise accessing the communications network. The memory 506 may be configured to store network addresses of one or more SBCs that are dynamically selected for the IP telephone to communicate during a registration process. The I/O unit 508 may be configured to communicate over the communications network using a communications protocol, as understood in the art. The display 510 may be configured to display information to a user to enable the user to place telephone calls or otherwise access the communications network.

Figure 6:
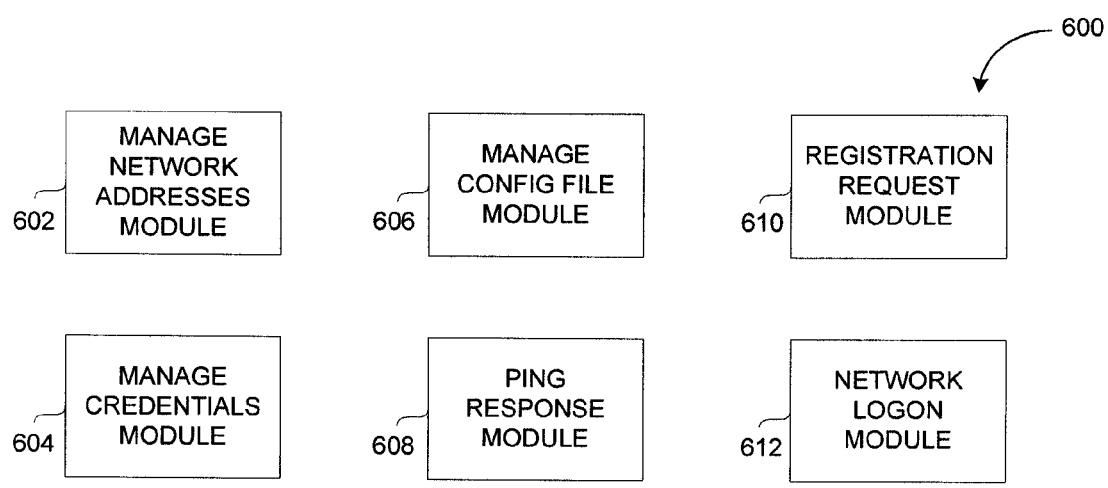
FIG. 6 is a block diagram of illustrative software modules that are executed by the IP telephone of FIG. 5 to provide the functionality of registering with the network registration device of FIG. 3.

With regard to FIG. 6, software module 600 of the software 504 (FIG. 5) are provided. The software module 600 may include a managed network addresses module 602 that is configured to manage network addresses of the NRD 300 (FIG. 3), SBCs, and any other communications device on the communications network. The managed network addresses module 602 may be configured to receive and store network addresses (e.g., IP addresses) of SBCs that are dynamically selected for the IP telephone to use during a registration process with the NRD 300. In one embodiment, the managed network addresses module 602 may be configured to receive one or more network addresses of SBCs during the registration process, and store each of the network addresses received during the registration process in an ordered list, such that the IP telephone 500 (FIG. 5) attempts to communicate with the SBCs in that order when attempting to place telephone calls via the communications network. In an alternative embodiment, a primary network address may be one that is selected by the NRD 300 and that network address is dynamically allocated to be used as a primary network address when the IP telephone is being used to place a call over the communications network and subsequent network addresses may be hard coded into the IP telephone (i.e., stored in volatile or non-volatile memory) such that if the primary network address is unavailable when a user attempts to place a call over the communications network that the subsequent network addresses may be used for placing a call over the communications network. The subsequent network addresses may be selected by the NRD 300 and be SBCs associated with QoS values less than the highest QoS (i.e., SBCs with "runner-up" QoS values)

A managed credentials module 604 may be configured to manage credentials that are generated and provided to the IP telephone during the registration process. The credentials may include a public IP address, username, and password that are used to enable the IP telephone to communicate with an SBC and enable the IP telephone to access a private side of the SBC, thereby enabling the IP telephone to communicate over the communications network.

A managed configuration file module 606 may be configured to enable the IP telephone to manage a configuration file that is provided to the IP telephone during or after the registration process. In managing the configuration file, the manage configuration file module 606 may store the configuration file and access the configuration file when needed by the IP telephone. In one embodiment, the managed configuration file module 606 may be utilized to request and receive a configuration file that is stored at an application server. The configuration file may be accessed on a daily basis in response to the IP telephone cycling or rebooting power to cause the IP telephone to register with the NRD on a daily basis so that the configuration file is up-to-date.

A ping response module 608 may be configured to respond to ping requests from SBCs or other network devices with certain information associated to a ping. The ping information may include delay time from a ping request being communicated from the SBC to the IP telephone, number of hops or network devices that the communication between the SBC and IP telephone has to make, jitter that occurs over the network path that is taken from the SBC to the IP telephone, and other ping response information, as understood in the art.

A registration request module 610 may be configured to perform a registration request with the NRD 300 (FIG. 3) during a power-up sequence. The registration request module 610 may be configured to communicate a registration request to the NRD 300 and receive the credentials and, optionally, a configuration file during the registration request. The registration request module 610 may be configured to communicate with any of the other modules 600 that are used to manage network addresses, manage credentials, manage configuration files, or otherwise.

A network logon module 612 may be configured to utilize credentials and the configuration file to log onto the communications network via the SBC that is determined to provide the highest QoS. It should be understood that the SBC selected may alternatively be one that is determined to be physically closest or electrically closest along the communications network to the IP telephone by using GPS, area code, or zip code to make such a determination by the NRD. If using geographic data to determine local SBCs with respect to the IP telephone, the NRD may utilize one or more databases to cross-reference SBCs that are closest to the IP telephones, as previously described.

Figure 7:
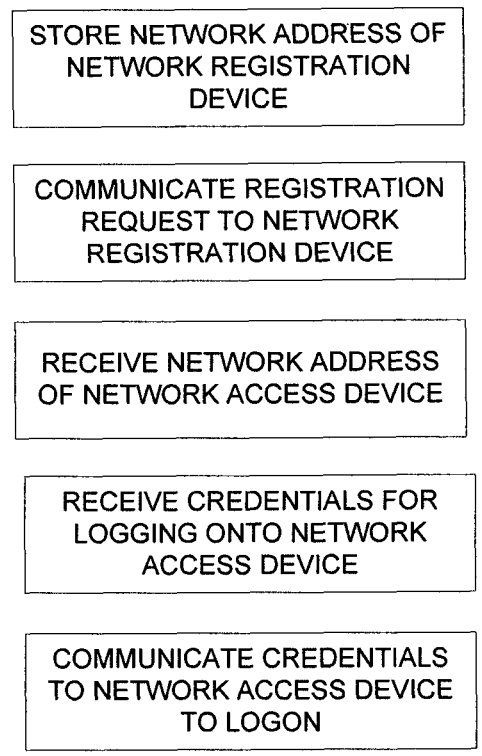
FIG. 7 is a flow diagram of an illustrative process for an IP telephone to register with a network registration device in accordance with the principles of the present invention.

With regard to FIG. 7, a flow chart of an illustrative process 700 for an IP telephone to register with an NRD is shown. The process 700 starts at step 702 where a network address of a network registration device is stored. The network address may be an IP address or other address that enables the IP telephone to initiate a registration process with the NRD to be performed. At step 704, a registration request may be communicated to the network registration device. The registration request may be communicated using data packets or other communications protocol, as understood in the art. At step 706, a network address of a network access device, such as an SBC, may be received by the IP telephone. In one embodiment, the network address of the network access device may be received in a configuration file. The network address of the network access device may be used by the IP telephone to place telephone calls over the communications network. At step 708, credentials for logging onto the network access device may be received by the IP telephone, where the credentials may include information that allows the IP telephone to log onto the network access device for placing calls. At step 710, the credentials may be communicated to the network access device for logging onto the network access device in placing the telephone calls. Although described as IP telephones, the principles of the present invention may be applied to other types of telephones and devices that use the same or other communications protocols to communicate over a communications network, such as the Internet.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for establishing connection of an IP telephone to a network, said system comprising:
  a plurality of network access devices configured to enable IP telephones to access a communications network; and
  a network registration device in communication with each of said network access devices, said network registration device including:
    a memory configured to store a network address of each of said network access devices;
    an input/output (I/O) unit configured to communicate signals over the communications network; and
    a processing unit in communication with said memory and I/O unit, said processing unit configured to:
      in response to receiving a registration request from an IP telephone, generate a first command to cause the network access devices to ping the IP telephone via respective network paths to the IP telephone;
      communicate the first command to the network access devices;
      receive ping information for each of the network access devices in response to the network access devices pinging the IP telephone via the respective network paths, wherein the ping information includes at least delay, jitter, packet loss, number of hops, and round-trip time;
      select a first network access device that has the highest quality network access path to the IP telephone in response to the ping information;
      in response to selecting the first network access device that has the highest quality network access path to the IP telephone, communicate a network address of the selected first network access device to an application server, wherein the application server forwards the network address to the IP telephone to enable the IP telephone to communicate with the selected first network access device and to register with the selected first network access device, wherein the highest quality network access path to the IP telephone is determined and updated at least daily; and communicate credentials to the IP telephone to enable the IP telephone to register with the selected first network access device;

when the network registration device is unavailable to the IP telephone, a user of the IP telephone causes the IP telephone to transmit an optimize message to the selected first network access device;

wherein the selected first network access device, in response to receiving an optimize message generated by the IP telephone when the network registration device is unavailable to the IP telephone;

generates a second command to cause the other network access devices to ping the IP telephone via respective network paths to the IP telephone;

selects a second network access device that has the highest quality network access path to the IP telephone in response to ping information; and in response to selecting the second network access device that has the highest quality network access path to the IP telephone, communicates a network address of the selected second network access device to the IP telephone.

2. The system according to claim 1, wherein the highest quality network path is a network that has the lowest delay.

3. The system according to claim 1, wherein the highest quality network path is a network path that has the lowest jitter.

4. The system according to claim 1, wherein the credentials include a public IP address, username, and password.

5. A method for establishing connection of an IP telephone to a network, said method comprising:

in response to receiving a registration request from an IP telephone, generating a first command to cause network access devices located on the network to ping the IP telephone via respective network paths;

communicating the first command to the network access devices;

receiving ping information for each of the network access device in response to the network access devices pinging the IP telephone via the respective network paths, wherein the ping information includes at least delay, jitter, packet loss, number of hops, and round-trip time;

selecting a first network access device that has the highest quality network access path to the IP telephone in response to the ping information;

in response to selecting the first network access device that has the highest quality network access path to the IP telephone, communicating a network address of the selected first network access device to an application server, wherein the application server forwards the network address to the IP telephone to enable the IP telephone to communicate with the selected first network access device to register with the selected first network access device, wherein the highest quality network access path to the IP telephone is determined and updated at least daily; and communicating credentials to the IP telephone to enable the IP telephone to register with a private side of the selected first network access device;

in response to receiving an optimize message generated by the IP telephone when the network registration device is unavailable to the IP telephone:

generating, with the selected first network access device, a second command to cause the other network access devices to ping the IP telephone via respective network paths to the IP telephone;

selecting, with the selected first network access device, a second network access device that has the highest quality network access path to the IP telephone in response to ping information; and communicating, with the selected first network access device and in response to selecting the second network access device that has the highest quality network access path to the IP telephone, a network address of the selected second network access device to the IP telephone.

6. The method according to claim 5, wherein the highest network path is a network path that has the lowest delay.

7. The method according to claim 5, wherein the highest quality network path is a network path that has the lowest jitter.

8. The method according to claim 5, wherein the credentials include a public IP address, username, and password.

9. A method for registering an IP telephone with a communications network, said method comprising:

storing, by the IP telephone, a network address of a network registration device in a memory location;

communicating, by the IP telephone, a registration request to the network registration device, wherein the registration request includes an area code associated with the IP telephone;

receiving, by the IP telephone, pings from network access devices via respective network paths to the IP telephone, in response to a network registration device communicating a first command to the network access devices;

receiving, by the IP telephone, a network address of a first network access device selected by the network registration device as having the highest quality network access path to the IP telephone, wherein the network address is forwarded by an application server, and wherein the highest quality network access path to the IP telephone is determined and updated at least daily;

receiving, by the IP telephone, credentials from the network registration device for logging onto the selected first network access device;

communicating the credentials by the IP telephone to the selected first network access device to register with the selected first network access device to access the communications network, wherein the credentials include a public IP address, username, and password that are used to enable the IP telephone to communicate with the selected first network access device and enable the IP telephone to access a private side of the selected first network access device; and communicating telephone call signals over the communications network by the IP telephone;

transmitting, with the IP telephone based on user input when the network registration device is unavailable to the IP telephone, an optimize message to the selected first network access device;

generating, with the selected first network access device and in response to the optimize message, a second command to cause the other network access devices to ping the IP telephone via respective network paths to the IP telephone;

selecting, with the selected first network access device, a second network access device that has the highest quality network access path to the IP telephone in response to ping information; and communicating, with the selected first network access device and in response to selecting the second network access device that has the highest quality network access path to the IP telephone, a network address of the selected second network access device to the IP telephone.

10. The method according to claim 9, further comprising updating a configuration file on the IP telephone.

11. The method according to claim 9, wherein communicating a registration request is performed in response to the IP telephone being powered up.

12. The method according to claim 9, further comprising storing the network address of the network access device, wherein the network access device is determined to have the highest quality of service with respect to the IP telephone.

13. The method according to claim 9, further comprising communicating a global positioning system (OPS) location to a network registration device.

14. The method according to claim 9, further comprising communicating a zip code to a network registration device.

\* \* \* \* \*